United States Patent
Lim et al.

(10) Patent No.: US 9,288,016 B2
(45) Date of Patent: Mar. 15, 2016

(54) METHOD AND APPARATUS FOR HARQ IN PEER-TO-PEER (P2P) COMMUNICATION SYSTEM

(75) Inventors: Dongguk Lim, Anyang-si (KR); Jiwoong Jang, Anyang-si (KR); Hangyu Cho, Anyang-si (KR); Kyujin Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 14/003,405

(22) PCT Filed: Dec. 23, 2011

(86) PCT No.: PCT/KR2011/010045
§ 371 (c)(1),
(2), (4) Date: Sep. 16, 2013

(87) PCT Pub. No.: WO2012/121477
PCT Pub. Date: Sep. 13, 2012

(65) Prior Publication Data
US 2014/0003400 A1    Jan. 2, 2014

Related U.S. Application Data

(60) Provisional application No. 61/450,566, filed on Mar. 8, 2011.

(51) Int. Cl.
*H04L 1/18* (2006.01)

(52) U.S. Cl.
CPC .................................. *H04L 1/1861* (2013.01)

(58) Field of Classification Search
None
See application file for complete search history.

(56) References Cited

U.S. PATENT DOCUMENTS

| | | | |
|---|---|---|---|
| 2006/0168343 A1 | 7/2006 | Ma et al. | |
| 2007/0153747 A1 | 7/2007 | Pan et al. | |
| 2011/0041027 A1* | 2/2011 | Fong et al. | 714/749 |
| 2012/0082145 A1* | 4/2012 | Chen et al. | 370/338 |
| 2012/0106517 A1* | 5/2012 | Charbit et al. | 370/336 |

FOREIGN PATENT DOCUMENTS

JP    2006-520158    8/2006

* cited by examiner

*Primary Examiner* — Diane Lo
(74) *Attorney, Agent, or Firm* — Lee, Hong, Degerman, Kang & Waimey

(57) ABSTRACT

The present specification discloses a method for making a hybrid automatic repeat request (HARQ) for a terminal in a wireless connection system supporting peer-to-peer (P2P) communication between terminals, the method comprising: receiving, from a base station, control data for P2P communication; transmitting, based on the received control data, data from an uplink or downlink subframe, which is defined as a region for transmission to another terminal; and receiving an Acknowledgement (ACK) or not-Acknowledgement (NACK) regarding the sent data from an uplink subframe, linked to the downlink or uplink subframe, among the subframes defined as a region for reception from another terminal. The control data comprises a frame structure data used in P2P communication, wherein the frame structure data comprises an arrangement of the transmission and reception regions and HARQ linkages between subframes.

10 Claims, 23 Drawing Sheets

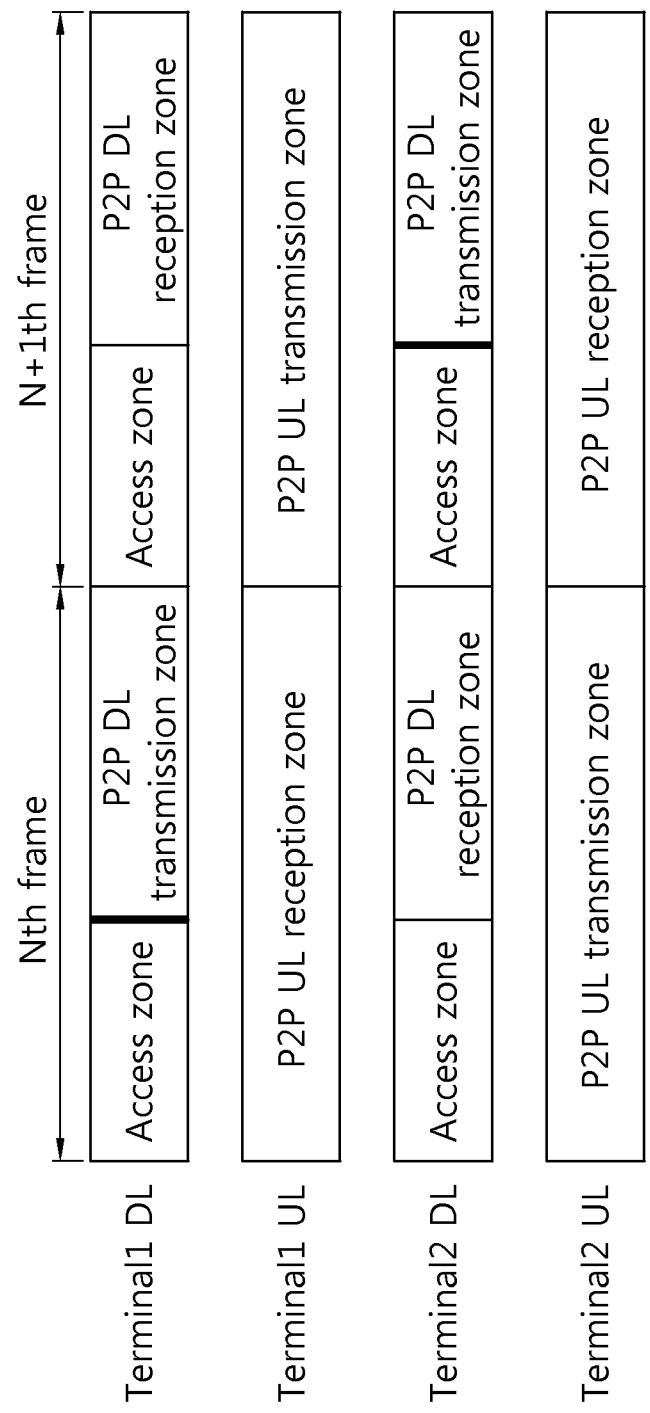

FIG. 2A

| CA1 | Communication link with base station including P2P control signal |

FIG. 2C

| CA1 | Communication link with base station including P2P control signal | P2P communication link |
| CA2 | Communication link with base station including P2P control signal | P2P communication link |

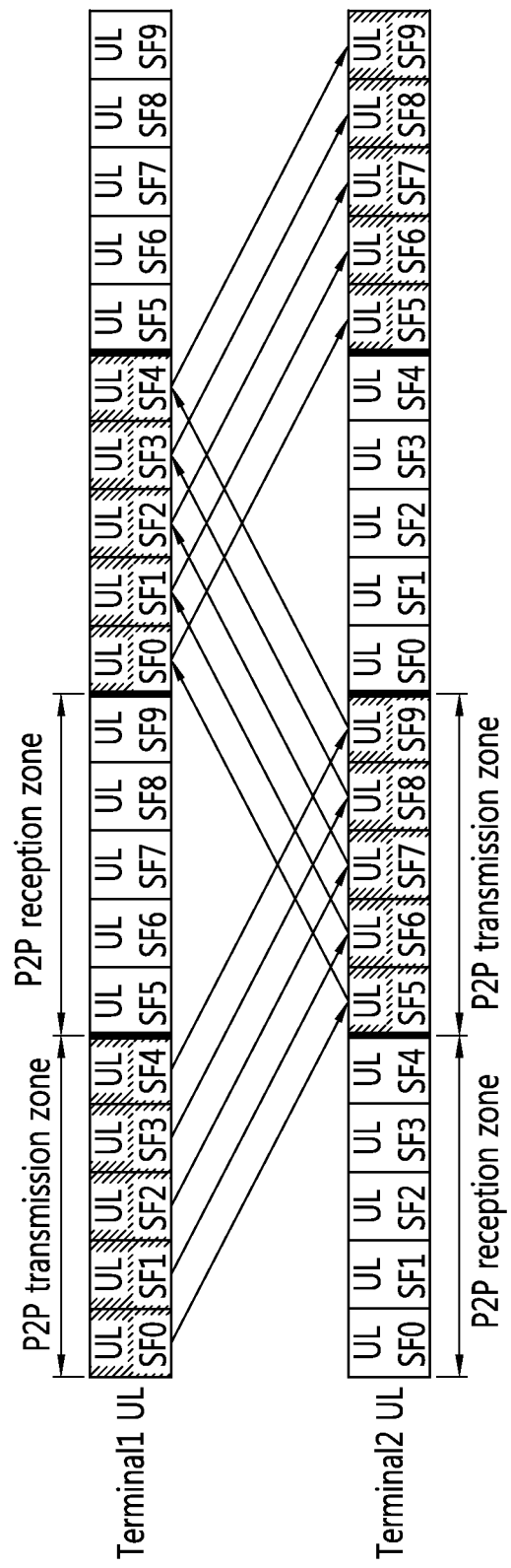

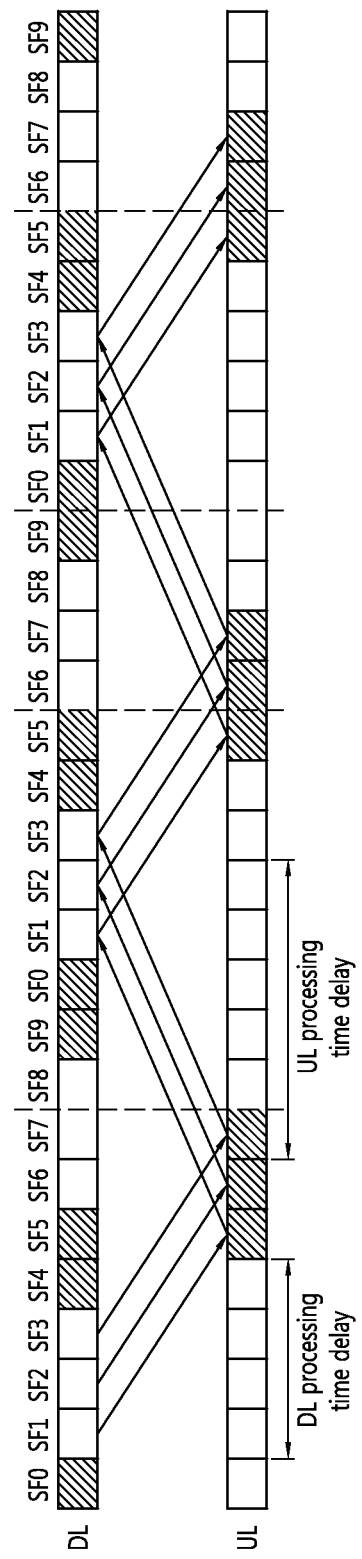

METHOD AND APPARATUS FOR HARQ IN PEER-TO-PEER (P2P) COMMUNICATION SYSTEM

CROSS-REFERENCE TO RELATED APPLICATIONS

This application is the National Stage filing under 35 U.S.C. 371 of International Application No. PCT/KR2011/010045, filed on Dec.23, 2011, which claims the benefit of U.S. Provisional Application Ser. No. 61/450,566, filed on Mar.8, 2011, the contents of which are all hereby incorporated by reference herein in their entirety.

BACKGROUND OF THE INVENTION

1. Field of the Invention

The present invention relates to an HARQ method in a P2P communication system and an apparatus using the same.

2. Related Art

P2P Communication

In a mobile communication system, a transmitting terminal communicates with a receiving terminal always through a mobile communication network irrespective of a distance between the transmitting terminal and the receiving terminal so as to perform communication with other terminals. In other words, a connection with the receiving terminal is established via a base station and a switching station that constitutes a mobile communication system regardless of the distance between the transmitting terminal and the receiving terminal. However, in case the transmitting terminal is very close to the receiving terminal, it may be more reasonable to fulfill a direct communication between the two terminals without going through a base station. Here, the inter-terminal direct communication not passing through a base station is hereinafter referred to as peer-to-peer ("P2P") communication. Various services may be provided through the P2P communication, such as transmission of mass files, VoIP, and video conferencing, and the same quality of service as the existing service that is provided through a base station may be achieved.

HARQ (Hybrid Automatic Repeat Request)

A technology for raising reliability of wireless communication is automatic repeat request (ARQ). In the ARQ, if a receiver fails to receive a data signal, a transmitter resends a data signal. Further, another technology is hybrid automatic repeat request (HARQ) that combines forward error correction (FEC) with ARQ. A receiver using HARQ basically attempts error correction on a received data signal and determines whether to resend using an error detection code. The error detection may use Cyclic redundancy check (CRC). If no error is detected from the data signal through a CRC detection process, the receiver determines that the data signal has been successfully decoded. In such case, the receiver sends an acknowledgement (ACK) signal to the transmitter. If an error is detected from the data signal through the CRC detection process, the receiver determines that decoding of the data signal has failed. In such case, the receiver sends a not-acknowledgement (NACK) signal to the transmitter. When receiving the NACK signal, the transmitter may resend the data signal to the receiver.

As such, HARQ is an important technology for increasing the reliability of wireless communication. However, in performing HARQ, when a data signal is transmitted or received and when an HARQ ACK/NACK signal is transmitted or received for the data signal matter. Accordingly, a need exists for a method of efficiently performing HARQ in a wireless communication system.

SUMMARY OF THE INVENTION

The present invention provides a method of efficiently performing HARQ in a wireless access system that supports P2P communication. Specifically, the present invention provides a method of performing HARQ in a P2P wireless access system using an FDD.

In an aspect, a method of performing, by a terminal, a hybrid automatic repeat request (HARQ) in a wireless access system supporting peer-to-peer (P2P) communication between terminals is provided. The method includes receiving control information for P2P communication from a base station, transmitting data to other terminal in a downlink subframe or uplink subframe defined as a transmission zone for transmission to the other terminal based on the received control information, and receiving an acknowledgement (ACK) or a not-acknowledgement (NACK) for the transmitted data in an uplink subframe, associated with the downlink or the uplink subframe, among subframes defined as a reception zone for reception from the other terminal. The control information includes frame structure information used for the P2P communication. The frame structure information includes an arrangement of the transmission zone and the reception zone in a frame and an HARQ linkage between subframes. The HARQ linkage between the subframes is configured so that a subframe associated for an HARQ does not overlap a subframe allocated for receiving a signal from the base station.

The HARQ linkage between the subframes may further include information related to a processing delay time.

The processing delay time may be set to be the same for both an uplink and a downlink. The processing delay time may be 5 ms.

The processing delay time may be set to be different for each of an uplink and a downlink. The processing delay time may be 6 ms for the uplink and 4 ms for the downlink.

The receiving the ACK or the NACK may include receiving ACKs or NACKs, for the data transmitted in one transmission zone, in one uplink subframe. The ACKs or the NACKs may be transmitted as a group in which each ACK or NACK is represented as a specific length of bits. Or, the ACKs or the NACKs may be transmitted in a form obtained by combining the ACKs or the NACKs through a predetermined logic operation.

In another aspect, a terminal performing a hybrid automatic repeat request (HARQ) in a wireless access system supporting peer-to-peer (P2P) communication between terminals is provided. The terminal includes a radio frequency unit for transmitting and receiving a wireless signal from an outside, and a controller connected with the radio frequency unit. The controller controls the radio frequency unit to receive control information for P2P communication from a base station, transmit data to other terminal in a downlink subframe or uplink subframe defined as a transmission zone for transmission to the other terminal based on the received control information, and receive an acknowledgement (ACK) or a not-acknowledgement (NACK) for the transmitted data in an uplink subframe, associated with the downlink or the uplink subframe, among subframes defined as a reception zone for reception from the other terminal. The control information includes frame structure information used for the P2P communication. The frame structure information includes an arrangement of the transmission zone and the reception zone in a frame and an HARQ linkage between subframes. The HARQ linkage between the subframes is configured so that a subframe associated for an HARQ does not overlap a subframe allocated for receiving a signal from the base station.

The HARQ linkage between the subframes may further include information related to a processing delay time. The processing delay time may be set to be the same for both an uplink and a downlink. Or, the processing delay time may be set to be different for each of an uplink and a downlink.

The controller may control the radio frequency unit to receive ACKs or NACKs, for the data transmitted in one transmission zone, in one uplink subframe.

According to embodiments of the present invention, in a P2P wireless access system using an FDD, each terminal may perform an efficient HARQ process. Further, the present invention may provide a frame structure suitable for the HARQ process.

BRIEF DESCRIPTION OF THE DRAWINGS

FIGS. 1a to 1c show embodiments of a frame structure used for P2P communication.

FIGS. 2a to 2c show examples of a frame structure used for multicarrier P2P communication.

FIGS. 6a to 6d show a first embodiment of an HARQ operation according to the present invention.

FIGS. 7a and 7b show a second embodiment of an HARQ operation according to the present invention.

DESCRIPTION OF EXEMPLARY EMBODIMENTS

Figure 1B:
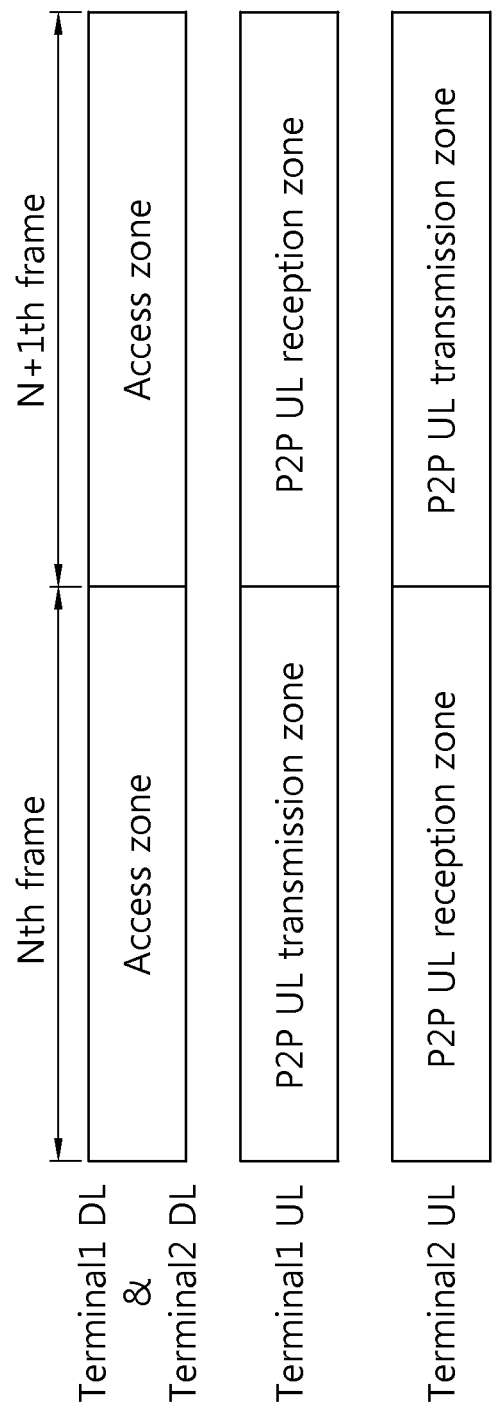

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Further, a "module" and a "unit" suffixes for components used in the present invention are given or mixed and used by considering easiness in preparing a specification and do not have a meaning or role distinguished from each other in themselves.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

Hereinafter, preferred embodiments according to the present invention are described in detail with reference to the accompanying drawings. The same or similar elements are assigned the same reference numerals irrespective of their reference numerals, and a redundant description thereof is omitted.

Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

Hereinafter, in order to clarify a description, embodiments of the present invention are described by long term evolution (LTE) standard chiefly, but the technical spirit of the present invention is not limited thereto.

Figure 1C:
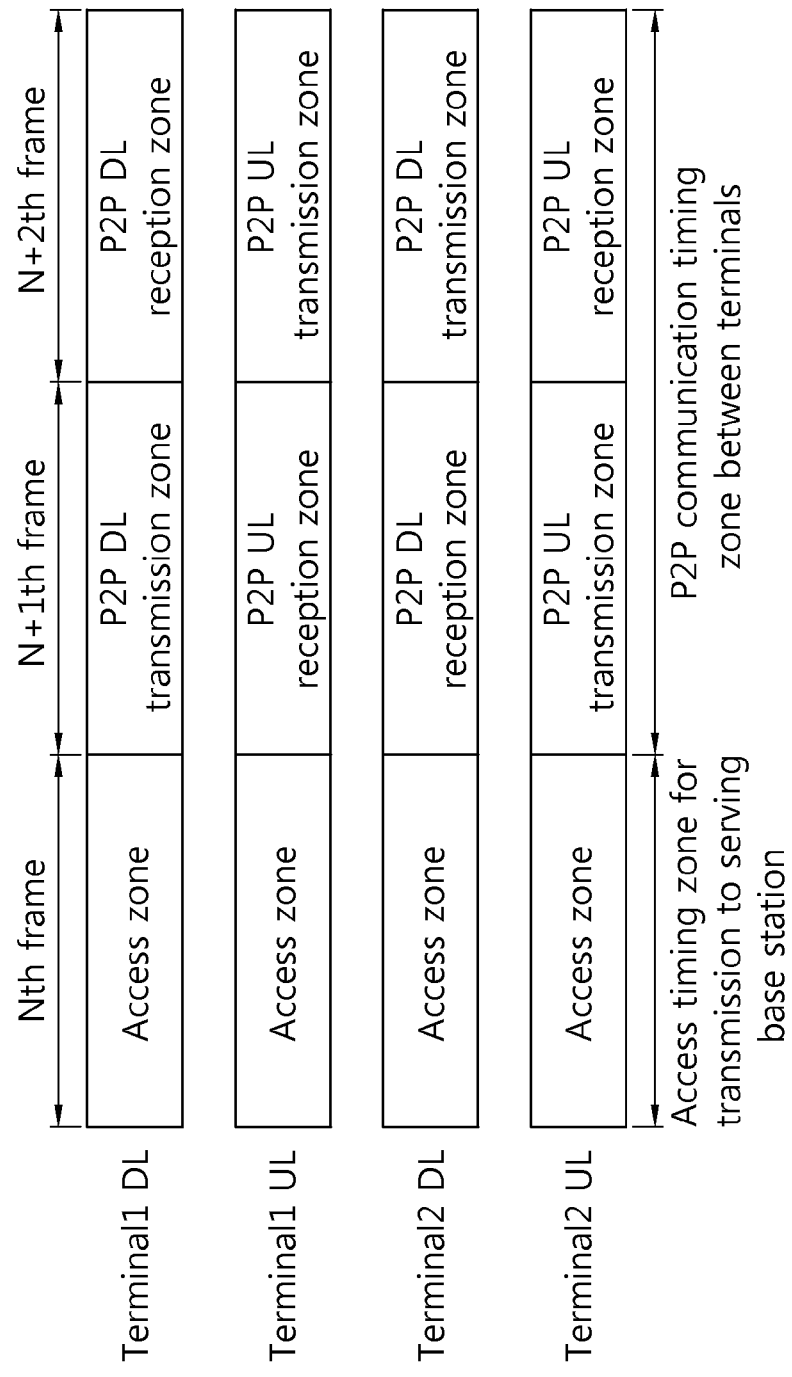

FIGS. 1a to 1c show embodiments of a frame structure used for P2P communication.

In a wireless communication system using a frequency division duplex (FDD), a frame used for P2P communication is separated into an access zone where a terminal communicates a signal with a base station and a P2P communication zone where a terminal communicates a signal with another terminal. A terminal receives system information and control information for P2P communication and paging from a base station through the access zone. As such, the P2P transmission through the access zone and the P2P communication zone may be conducted using the following frame structure (FS) in an FDD system.

FIG. 1a shows an example in which data is transmitted between terminals through a downlink (DL) frame, and a feedback for the data is transmitted through an uplink (UL) frame.

Terminal 1 and terminal 2 receive system information, paging, or P2P control information from a base station through an access zone in a DL frame. Terminal 1 transmits data to terminal 2 having a P2P connection using resources (for example, P2P communication zone) of the DL frame except the access zone. When receiving the data through the P2P communication zone of the DL frame, terminal 2 transmits a feedback for the received data. When terminal 2 transmits data to terminal 1, terminal 2 configures a frame in the opposite way of the FS and transmits data to terminal 1. In other words, terminal 2 transmits data to terminal 1 through the P2P communication zone of the DL frame and in response thereto receives feedback information from terminal 1 through the P2P communication zone of the UL frame. The terminals perform P2P transmission by switching a transmission mode and a reception mode in the DL/UL frames and at this time the mode switching may be done on a per-subframe basis, on a per-frame basis, or on a per-superframe basis. The access zone where the base station communicates signals with the terminals is configured on a per-subframe basis or on a per-frame basis.

In FIG. 1a, terminal 1 and terminal 2 receive control information (system information, paging, or P2P transmission information) from the base station through the access zone of the DL frame. At this time, data transmission and reception between the terminals is not performed. Accordingly, since the terminals need not transmit a feedback for the signal received through the access zone through the UL frame, the whole UL frame may be allocated for P2P transmission. The terminals perform P2P transmission using the whole UL frame and the DL frame except the access zone. Terminal 1 operates in a transmission mode in the P2P DL communication zone to transmit signals to terminal 2, and terminal 2 operates in a reception mode in the same zone to receive signals. Thereafter, terminal 2 in order to transmit a feedback for the signal received from terminal 1 operates in the transmission mode in the UL frame zone, and terminal 1 in order to receive the feedback in the same zone operates in the reception mode. For switching of the transmission/reception modes described above, a switching gap is needed. The gap may be positioned between the access zone and the P2P DL transmission zone as shown in FIG. 1a. Or, the gap may also be positioned between the P2P UL reception zone and the P2P UL transmission zone or between the P2P DL transmission zone and the access zone. However, in case the idle time of the FDD FS is larger than the gap, no separate gap needs to be allocated. The gap may be allocated on a per-symbol basis or on a per-subframe basis.

Unless the terminals receive data from the base station through the access zone, the terminal need not transmit any feedback for the data to the base station, and no access zone is set in the UL frame. However, in case the terminal receives data from the base station, a portion of the UL frame may be set as an access zone to transmit a feedback for the data to the base station. The position of the access zone in FIG. 1a is merely an example, and is not limited thereto.

FIG. 1b shows an example of a frame structure in which a DL frame is used for a terminal to receive a signal from a base station and a UL frame is used for P2P communication between terminals.

The terminal receives control information from the base station as described in FIG. 1a and allocates a DL frame as an access zone for the same. In the frame structure shown in FIG. 1b, the DL frame is used for receiving a signal from the base station, and the UL frame is used for P2P communication only. At this time, the UL frame may be separated into a P2P UL reception zone and a P2P UL transmission zone. The P2P UL transmission zone and the P2P UL reception zone may be configured on a per-subframe basis, on a per-frame basis, or on a per-superframe basis.

FIG. 1b shows an example of a frame structure in which the transmission/reception zones are allocated on a per-frame basis. Terminal 1 and terminal 2 performing P2P communication configure frames having zone allocations different from each other. At this time, a switching gap is needed to switch the transmission/reception modes of the terminal. At this time, the gap may be allocated on a per-symbol basis or on a per-subframe basis and may be positioned in a transmission zone or reception zone. In case the transmission/reception zones are switched on a per-frame basis, if the idle time is larger than the gap, the mode switching is conducted without configuring an additional gap. As described above, since the terminal receives only control information from the base station through the DL frame, the terminal does not transmit a feedback to the base station in the UL frame. Accordingly, the HARQ for P2P transmission performed through the UL frame is conducted in the same way as the HARQ performed in the existing system.

FIG. 1c shows an example of a frame structure using a timing zone in an FDD system.

As described above, the terminal should receive control information such as system information, paging, P2P control information, from the base station. As an access zone for the same, a predetermined time slot may be set in the FDD system. That is, in the FDD system, a frame structure may be used in which there are an access zone and a P2P transmission/reception zone separated from each other as shown in FIG. 1c. At this time, the timing zone allocated for the two zones may be allocated on a per-subframe basis, on a per-frame basis, or on a per-superframe basis. In the access zone and P2P transmission/reception zone, the terminal performs each of signal transmission/reception with the base station and P2P transmission between terminals. In the FDD frame structure as shown in FIG. 1c, the HARQ performed in the existing system may apply likewise.

Figure 2B:
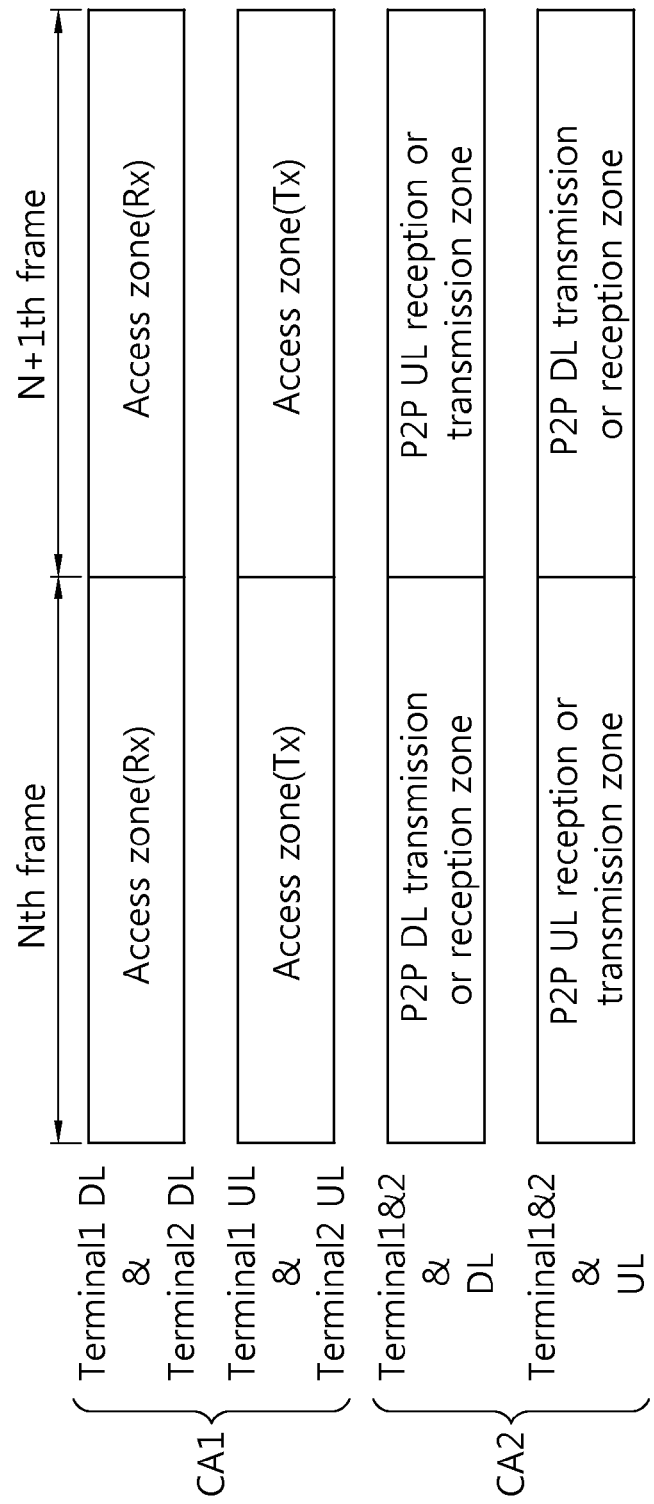

FIGS. 2a to 2c show examples of a frame structure used for multicarrier P2P communication.

A terminal performing P2P communication may support a single- or multi-carrier operation. In case the terminal supports only the single carrier operation, the terminal may perform P2P transmission by the following method. At this time, the terminal receives control information for P2P communication through a carrier that is being used for communication with the base station.

Thereafter, the terminal may be allocated a separate carrier for P2P transmission and may perform P2P transmission using the allocated carrier. At this time, since the terminal supports only the single carrier operation, the terminal performs carrier switching for P2P transmission. The terminal performs P2P transmission using the DL/UL frames of the allocated carrier.

Or, the terminal, without being allocated a separate carrier for P2P transmission, may also perform P2P transmission using a portion of the frame of the carrier that is being used for communication with the base station. The terminal performing such an operation may conduct P2P transmission using the frame structures as shown in FIGS. 1a to 1c.

The terminal supporting the multi-carrier operation may perform P2P transmission as shown in FIG. 2a. The terminal receives control information for the P2P transmission and information for the allocated carrier through a carrier (CA 1) that is used for signal transmission/reception with the base station and at this time may receive the information by configuring an access zone in the carrier. The terminal performs P2P transmission using a carrier (CA 2) allocated for P2P transmission.

FIG. 2b shows another example of the frame structure used for P2P transmission through a multi-carrier. The transmission/reception zone for P2P transmission may be configured on a per-subframe basis, on a per-frame basis, or on a per-superframe basis. A switching gap may be used for switching transmission/reception zones, and the switching gap may be positioned in one of the two zones. The terminal uses only one carrier (CA 2) for P2P transmission, and thus, the HARQ for P2P transmission in the carrier may use the HARQ of the existing FDD system.

FIG. 2c shows another example of the frame structure used for P2P transmission through a multi-carrier.

Unlike FIGS. 2a and 2b, the terminal performing the multi-carrier operation may perform the transmission/reception with the base station and P2P transmission with another terminal on both the multiple carriers (CA 1 and CA 2). At this time, the terminal uses a portion of the carrier (CA 1) having a connection with the base station for P2P transmission and performs transmission/reception with the base station and the P2P transmission on the other carrier (CA 2).

Figure 3A:
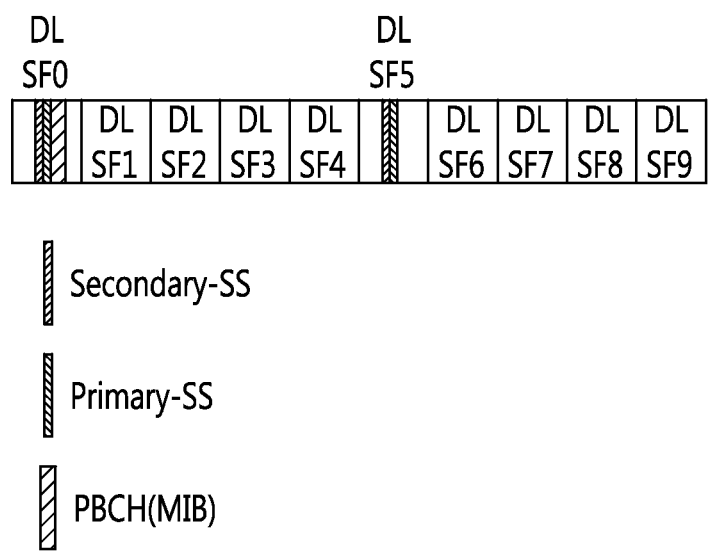
FIGS. 3a to 3c show examples of a frame structure used for P2P transmission in an LTE system.
Figure 3B:
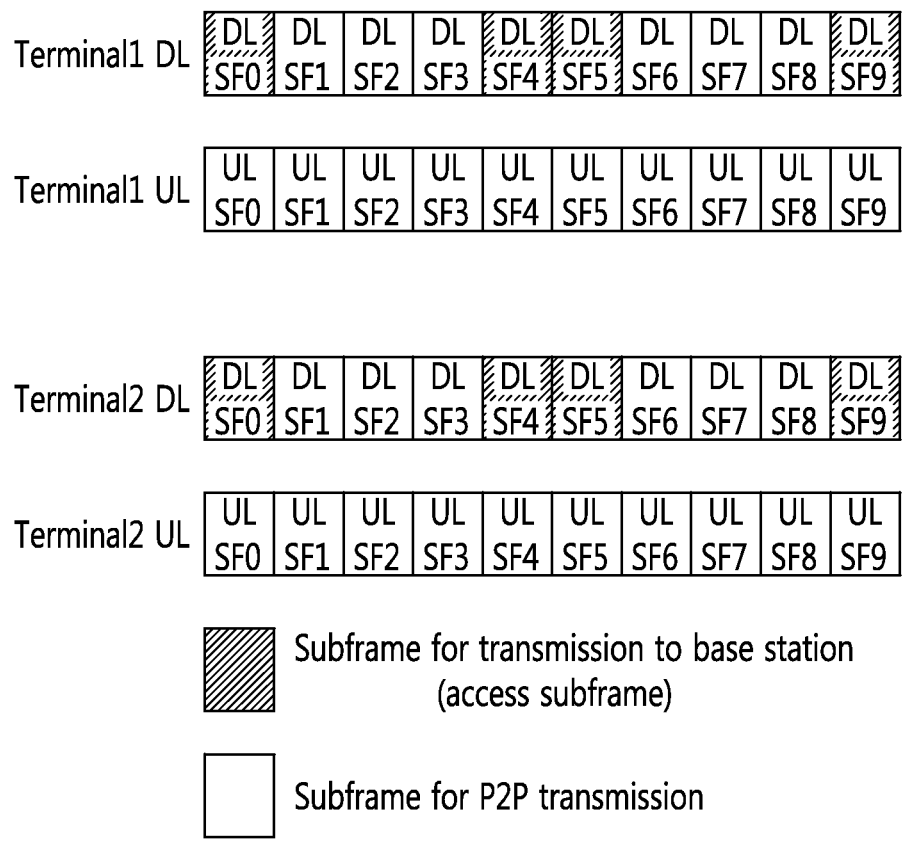
Figure 3C:
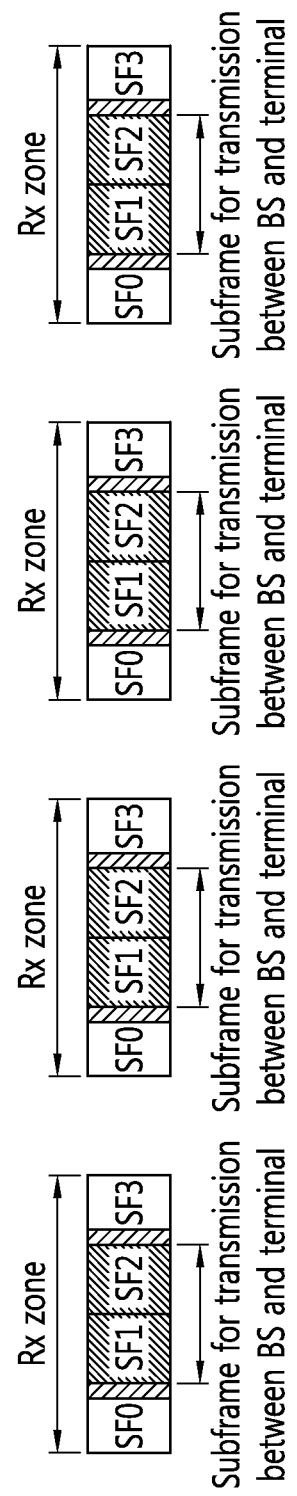

FIGS. 3a to 3c show examples of a frame structure used for P2P transmission in an LTE system.

An LTE FDD system as an example of the frame structure described above in FIGS. 1 and 2 is considered. As shown in FIG. 3a, the frame of the LTE FDD consists of 10 subframes (SFs) and each subframe includes two slots.

In the first subframe of the frame, the base station transmits a master information block (MIB) to the terminal through a physical broadcast channel (PBCH). The PBCH is transmitted at a cycle of 40 ms. A synchronization sequence (SS) is transmitted through the physical downlink shared channel (PDSCH) of the first subframe (DL SF0) and sixth subframe (DL SF5). The primary SS is repeated in the same way in SF0 and SF5, but the secondary SS is transmitted differently in SF0 and SF5. Since the SS is divided into two and is transmitted through two subframes, the terminal needs to receive all of the subframes where the SS is transmitted. The MIB transmitted through the first subframe of each frame includes the following information:
  downlink cell bandwidth
  PHICH duration and resource
  antenna configuration
  system frame number (SFN)

The terminal further receives system information and paging from the base station through the subframes SF0, SF4, SF5, and SF9. The system information includes the following information.
  (1) SIB 1
  This is transmitted every sixth subframe (DL SF5) of the even frames at a cycle of 80 ms and contains cell access-related parameters or scheduling information of other SIBs.
  (2) SIB 2
  This is transmitted at a cycle of 160 ms and contains UL bandwidth, random access parameters, UL power control parameters, or configuration of control channel (RACH, BCCH, PCCH, PRACH, PDCCH, PDSCH, PUSCH).

DL SF0, SF4, SF5, and SF9 used for the terminal to receive system information, etc. are defined as access subframes. Terminals performing P2P communication also receive control information for P2P communication and/or system information through the access subframes. The control information for the P2P communication may include the following information.
  P2P zone arrangement
  scheduling information of DL/UL (for example, number of subframes or slots, start point, mode switching indication, cycle, gap indication, discovery sequence, hopping pattern, cyclic shift value, etc.)
  P2P power control
  threshold (SIR, SINR, interference level)
  offset (time/frequency)
  identifier (grouping or pairing)
  subframe offset Accordingly, the FDD DL frame of the terminal consists of the remaining DL subframes except DL SF0, SF4, SF5, and SF9. Thus, the frame structure of the LTE FDD for P2P may be represented as shown in FIG. 3b.

Referring to FIG. 3b, two terminals (terminal 1 and terminal 2) performing P2P receive control information for P2P transmission through access subframes (DL SF0, SF4, SF5, and SF9) from the base station. Thereafter, terminal 1 and terminal 2 perform P2P transmission using the UL frame and SF1, SF2, SF3, SF6, SF7, SF8 of the DL frame.

The terminal (terminal 1) transmitting data transmits data to terminal 2 through the allocated DL subframes (SF1, SF2, SF3, SF6, SF7, and SF8). Accordingly, in the DL subframes (SF1, SF2, SF3, SF6, SF7, and SF8), terminal 1 operates in the transmission mode, and terminal 2 operates in the reception mode. Terminal 2 transmits a feedback and HARQ information for the data received from terminal 1 to terminal 1 through the UL frame. Accordingly, in the corresponding UL frame, terminal 2 operates in the transmission mode, and terminal 1 operates in the reception mode.

The UL frame may be used not only for transmission/reception of a feedback for P2P transmission but also for the terminal to transmit a feedback for the data received through the access subframe from the base station. In case the UL frame is used in association with the P2P transmission, control information for allocation and use for the UL frame is included in the P2P control information and is transmitted to the terminal. In case a UL subframe is allocated for signal transmission/reception with the base station, the UL subframe has an HARQ linkage with a DL subframe for receiving a signal from the base station. The UL subframe allocated to transmit a signal to the base station operates always in the transmission mode regardless of the P2P transmission mode. In the subframe except the UL subframe, i.e., the UL subframe used for P2P transmission, the terminal switches transmission/reception modes and transmits/receives signals. A gap is allocated for transmission/reception switching of the terminal and the gap may be allocated as shown in FIG. 3c.

FIG. 3c shows an example where a subframe (e.g., an access subframe) for transmitting a signal to a base station is positioned in a UL reception zone for P2P transmission. In this case, a gap for mode switching may be placed in the first or last symbol of the subframe for transmitting a signal to the base station or a subframe in the P2P zone. One or more symbols may be allocated for a switching gap, and the symbol allocated for the gap is placed in the first or last position of the subframes allocated for P2P transmission. Accordingly, in case terminal 1 and terminal 2 transmit signals as shown in FIG. 3b, the first symbols of DL SF1 and SF6 and the last symbols of DL SF3 and SF8 are set as gaps, so that the subframes have a form in which one symbol is reduced.

Figure 4:
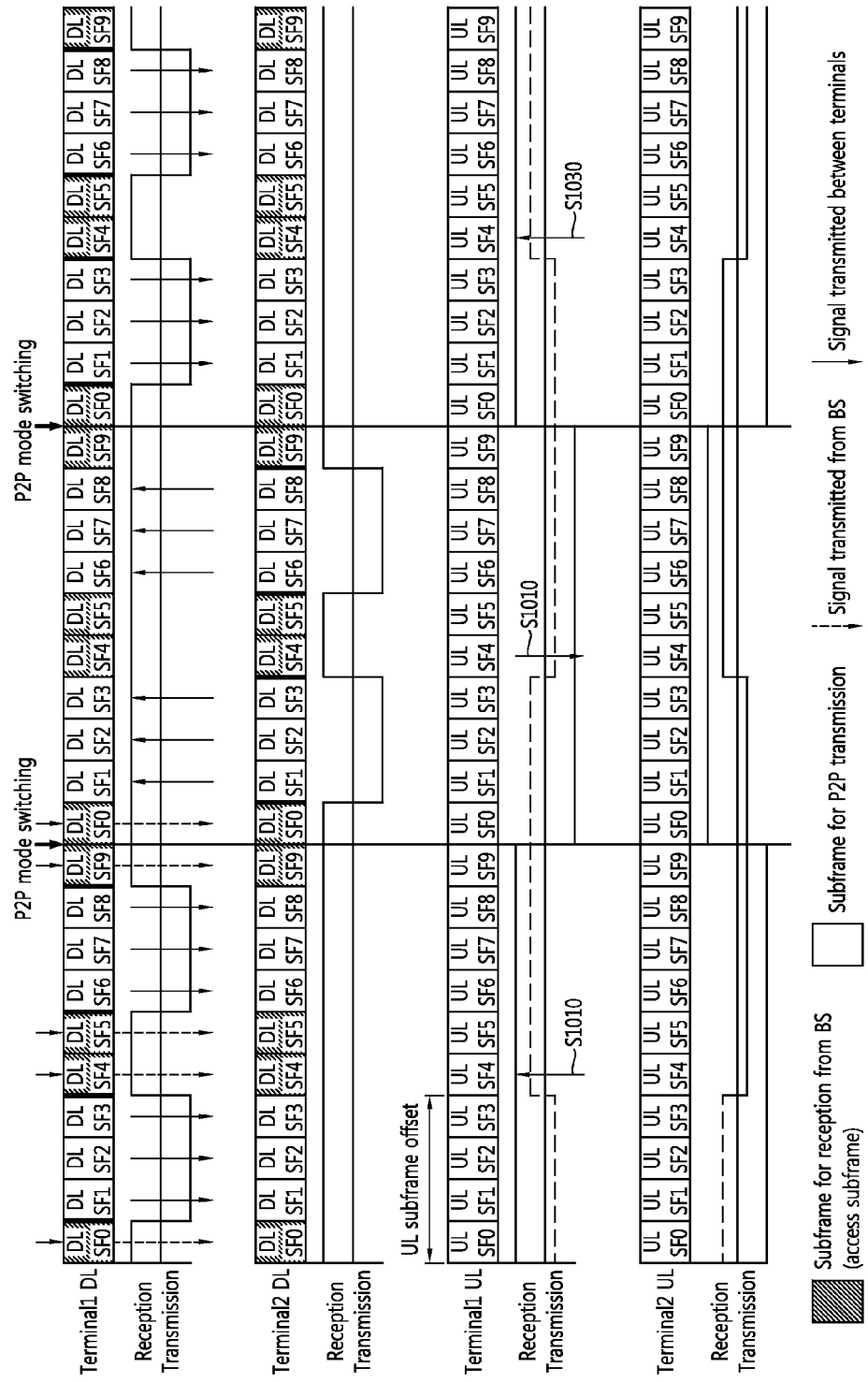
FIG. 4 shows a frame structure when P2P transmission or reception mode is switched.

FIG. 4 shows a frame structure when P2P transmission or reception mode is switched.

In case only DL subframe is used for P2P transmission, the transmission mode and reception mode in the DL frame apply to terminal 1 and terminal 2 in opposite ways. According to data transmission of the terminal, the operation mode of the terminal switches in the DL subframe, and the operation mode switching applies on a per-subframe basis, on a per-frame basis, or on a per-superframe basis.

FIG. 4 shows an example in which the P2P transmission mode (transmission or reception) of the terminal switches on a per-frame basis. At this time, since the first and last subframes of the frame are used for reception of signals from the base station, no separate gap is needed for mode switching. However, in case an access subframe is included in the frame of the transmission mode, a gap is allocated. Terminal 1 receives control information for P2P transmission through access subframes (DL SF0, SF4, SF5, and SF9) and transmits a signal to terminal 2 through a subframe other than the access subframes. Thereafter, terminal 2 transmits a feedback and/or HARQ information to terminal 1 through a UL frame of the corresponding frame. At this time, terminal 1 operates in the reception mode in the UL frame, and on the contrary, terminal 2 operates in the transmission mode in the UL frame. Also in the UL frame, transmission/reception mode switching of the terminal is performed at the same cycle as in the DL frame, and the last symbol of the last subframe of the transmission mode or the first symbol of the first subframe of the reception mode is allocated as a gap. One symbol being allocated as a gap is merely an example. The length of the gap is not limited. For the gap, some subframes may be set as idle subframes or may be punctured and used.

As shown in FIG. 4, terminal 1 and terminal 2 operate in different modes on DL/UL for P2P transmission, and at this time, period information received from the base station is used to perform mode switching. The terminal may set the start points transmission/reception zones or transmission/reception modes in the UL frame differently from those in the DL frame. As denoted in the dotted lines of FIG. 4, the start subframe of UL may be set differently from that of DL for efficient HARQ transmission. For example, in case the processing time is considered as four subframes, the terminal may start signal transmission/reception in the UL subframe at UL SF4 (virtual SF0) and receives information thereon from the base station. At this time, the terminal may transmit and receive a signal by performing mode switching on a per-frame basis using the virtual subframe index.

The terminal may also transmit a feedback for the signal received using only the DL subframe through the DL subframe, and even at this time, may perform switching on the DL operation mode on a per-frame basis or on a per-superframe basis as described above.

In case the terminal transmits a signal using only the DL subframe in the P2P communication, the terminal has a restriction in using the DL subframe due to the access subframes (DL SF0, SF4, SF5, and SF9). However, in case the terminal transmits and receives a signal using the UL frame, the terminal may avoid any subframe restrictions, and thus, the terminal may perform P2P transmission/reception more efficiently. Terminal 1 and terminal 2 performing P2P transmission receive system information and P2P control information from the base station through the access subframes (DL SF0, SF4, SF5, and SF9) and transmit signals to other terminals using the UL frame. At this time, terminal 1 and terminal 2 perform transmission and reception, respectively, in the same frame, and the transmission mode and reception mode are switched on a per-subframe basis, on a per-frame basis, or on a per-superframe basis. At this time, the switching cycle may vary depending on the P2P transmission link (e.g., terminal 1->terminal 2, terminal 2->terminal 1). The mode switching cycle according to each P2P transmission link is transmitted to terminal 1 and terminal 2 through the access subframes. In case P2P transmission is performed using only the UL frame, the operation mode is switched on a per-frame basis, and thus, no separate switching gap needs to be configured in the frame.

In case P2P transmission is performed using only the UL frame, the UL frame allocated to the terminal may be separated into subframes for transmission/reception of signals between terminals using time division multiplexing (TDM). A gap is allocated for transmission/reception switching between the last subframe constituting the transmission zone in the UL frame and the first subframe constituting the reception zone. At this time, one or more symbols may be allocated for the gap, and the symbols allocated as the gap may be positioned in the last symbol of the last subframe of the transmission zone or in the first symbol of the first subframe of the reception zone.

Two terminals may transmit and receive signals therebetween in one frame, and at this time, one DL frame and one UL frame each may be divided into two zones for performing P2P transmission. First, the DL/UL subframes each may consist of a transmission zone (e.g., DL SF1, SF2, and SF3) and a reception zone (e.g., DL SF6, SF7, and SF8). Terminal 1 transmits a signal and data to terminal 2 through the DL transmission zone (e.g., DL SF1, SF2, and SF3). In the DL reception zone of the same frame, terminal 2 receives the signal and data transmitted from terminal 1. In the UL frame, terminal 2 transmits a feedback and ACK/NACK signals for the signal received from terminal 1 through the UL transmission zone (e.g., UL SF6, SF7, and SF8). Terminal 1 receives the signals transmitted through the UL subframes from terminal 2 through the UL reception zone (e.g., UL SF1, SF2, and SF3). Terminal 2 also perform the same operations as terminal 1 did using each zone of the DL/UL frames in the same frame.

Figure 5A:
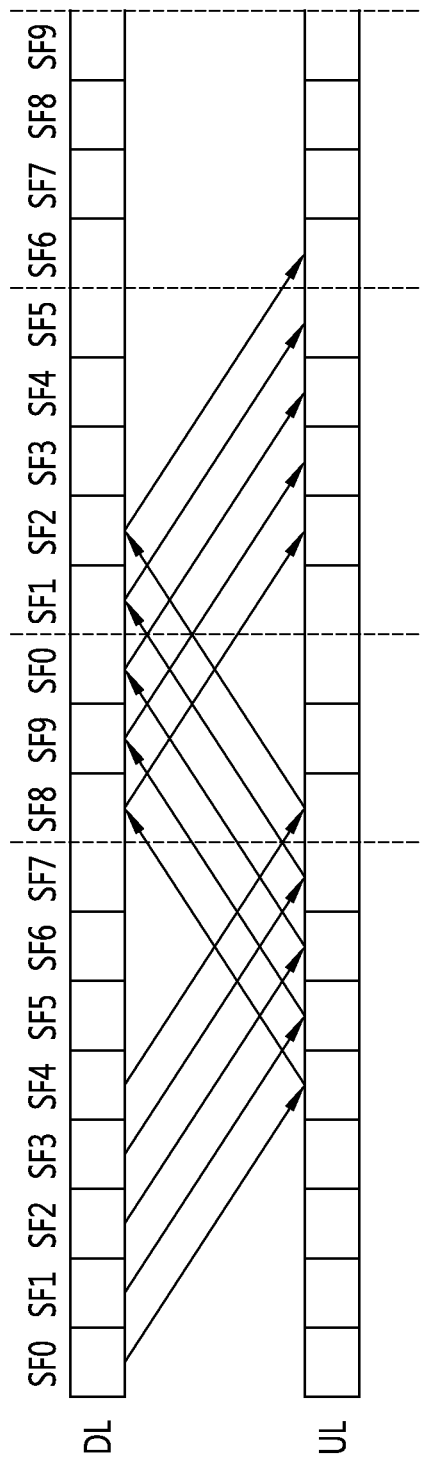
FIGS. 5a and 5b are show an HARQ operation in P2P communication according to the prior art.
Figure 5B:
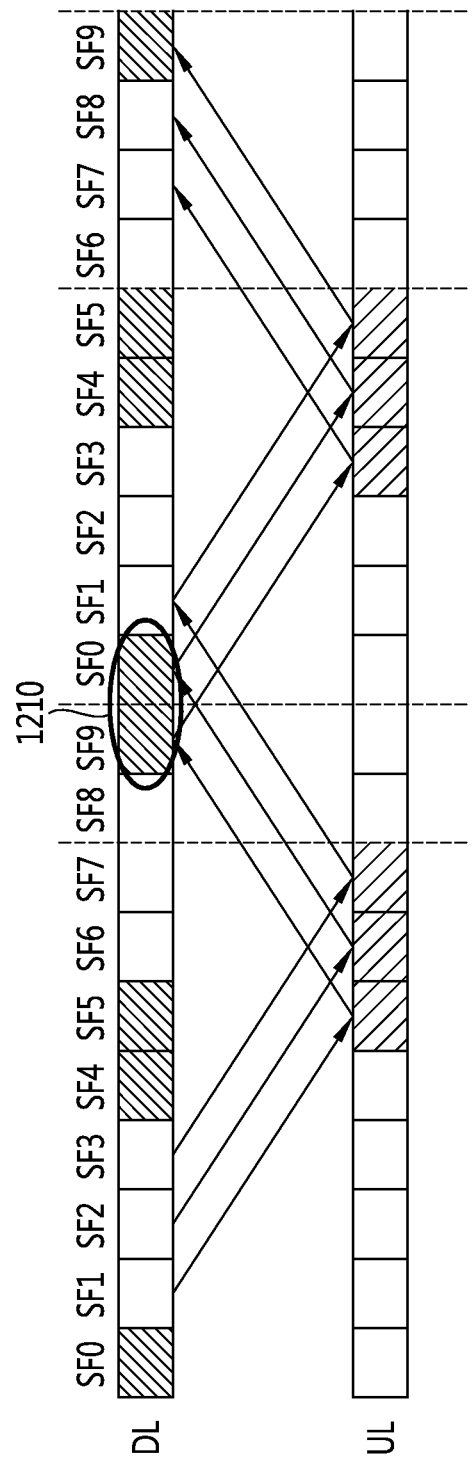

FIGS. 5*a* and 5*b* are show an HARQ operation in P2P communication according to the prior art.

The terminal may transmit and receive an ACK/NACK for data transmission from/to another terminal using the frame structure described above in FIGS. 1 to 4. In the LTE FDD system, the terminal may perform a synchronous HARQ operation for UL transmission and an asynchronous HARQ operation for DL transmission. Referring to FIG. 5*a*, the DL/UL HARQ operations consist of a cycle of 8 ms, and at this time, the DL/UL processing time delay is considered as four subframes (4 ms).

In the frame structure shown in FIG. 5*a*, the length of the frame is an integer multiple of 10 ms, but since HARQ is performed every 8 ms (like IEEE 802.16m), there is no HARQ linkage with the structure in which the DL/UL subframes are defined in each frame. Accordingly, it is difficult to keep the ACK/NACK for one DL subframe and linkage for re-transmission uniform. The subframes DL SF0, SF4, SF5, and SF9 (access subframes) are not allocated to the terminal for P2P transmission. Thus, in case the HARQ operation is conducted having the existing 8 ms cycle and four subframe processing timing delay, the access subframes overlap each other, so that HARQ transmission is difficult to perform. For example, the terminal that receives a grant for UL transmission through a PDCCH transmitted through DL SF1, SF2, and SF3 transmits UL data in UL SF5, SF6, and SF7. The HARQ feedback (ACK/NACK) for the UL signal transmitted through the subframe is transmitted through DL SF9, SF0, and SF1. However, in the P2P transmission, the subframes, DL SF0, SF4, SF5, and SF9, are access subframes for receiving system information from the base station, and thus, the terminal might not transmit the HARQ feedback for P2P transmission using the subframes. The HARQ timing 1210 when the above-described subframes overlap each other may be shown in FIG. 5*b*.

FIGS. 6*a* to 6*d* show a first embodiment of an HARQ operation according to the present invention.

To address the HARQ timing problem of the prior art, an HARQ operation according to the present invention is as follows.

In order to avoid an overlap with a subframe (access subframe) used for the terminal to receive a signal from the base station, an HARQ having a cycle of 10 ms may be considered. In such case, during the course of the HARQ process, subframe linkage is maintained on a per-frame basis.

Figure 6A:
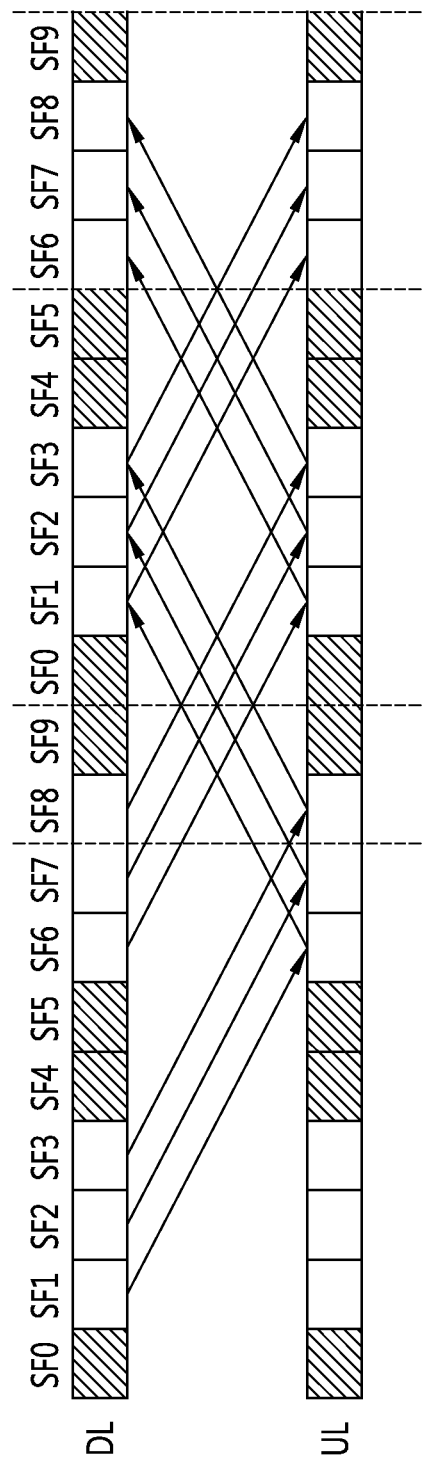

At this time, the processing delay time may be set as five subframes (5 ms), and the HARQ process may be represented as shown in FIG. 6*a*.

The terminal receives control information for P2P communication from the base station. The control information may include frame structure information used in the P2P communication. The frame structure information may include arrangement of a transmission zone and a reception zone in the frame and HARQ linkage between subframes. The HARQ linkage between the subframes is configured so that a subframe associated for HARQ does not overlap a subframe allocated for receiving a signal from the base station.

For P2P transmission, the subframes (SF1, SF2, SF3, SF6, SF7, and SF8) allocated to terminal 1 and terminal 2 form linkage to each other for HARQ operation and transmit ACK/NACK for data reception. An example of the linkage between the DL subframe and the UL subframe for HARQ operation is as follows.

(DL SF1 and UL SF6); (DL SF2 and UL SF7); (DL SF3 and UL SF8); (DL SF6 and UL SF1); (DL SF7 and UL SF2); (DL SF8 and UL SF3);

As in the above examples, since the DL/UL subframe linkage for HARQ operation is uniform, HARQ transmission efficiency is lifted. In the LTE FDD, the HARQ timings for P2P transmission may be represented as shown in FIGS. 6*b* to 6*d*.

Figure 6B:
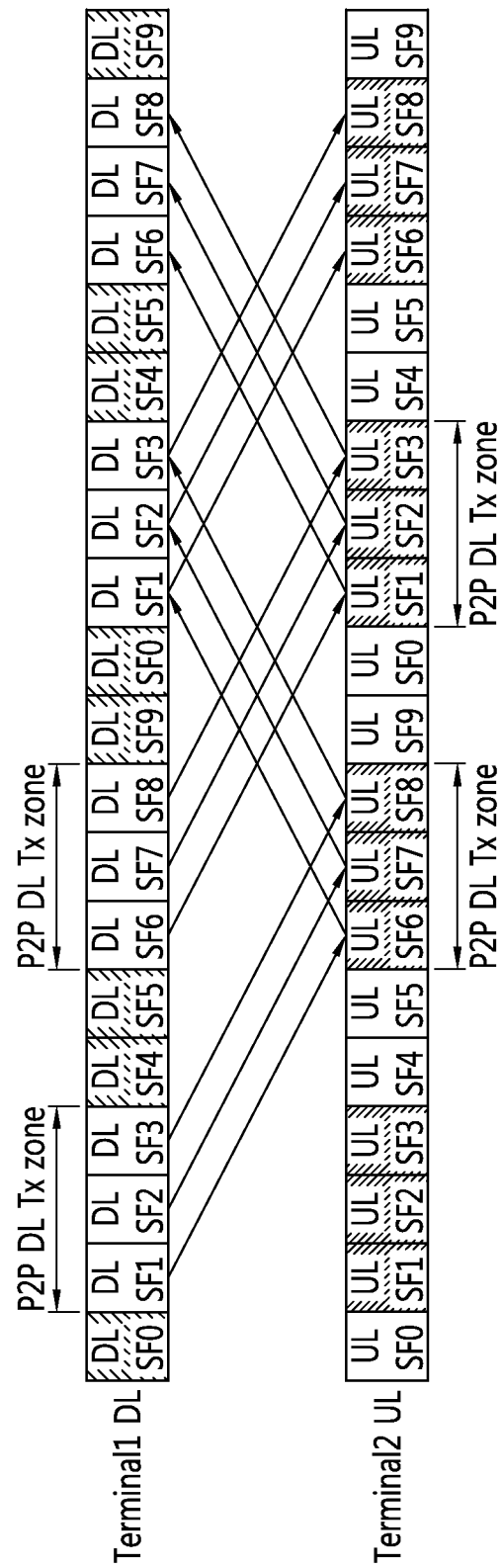
Figure 6D:
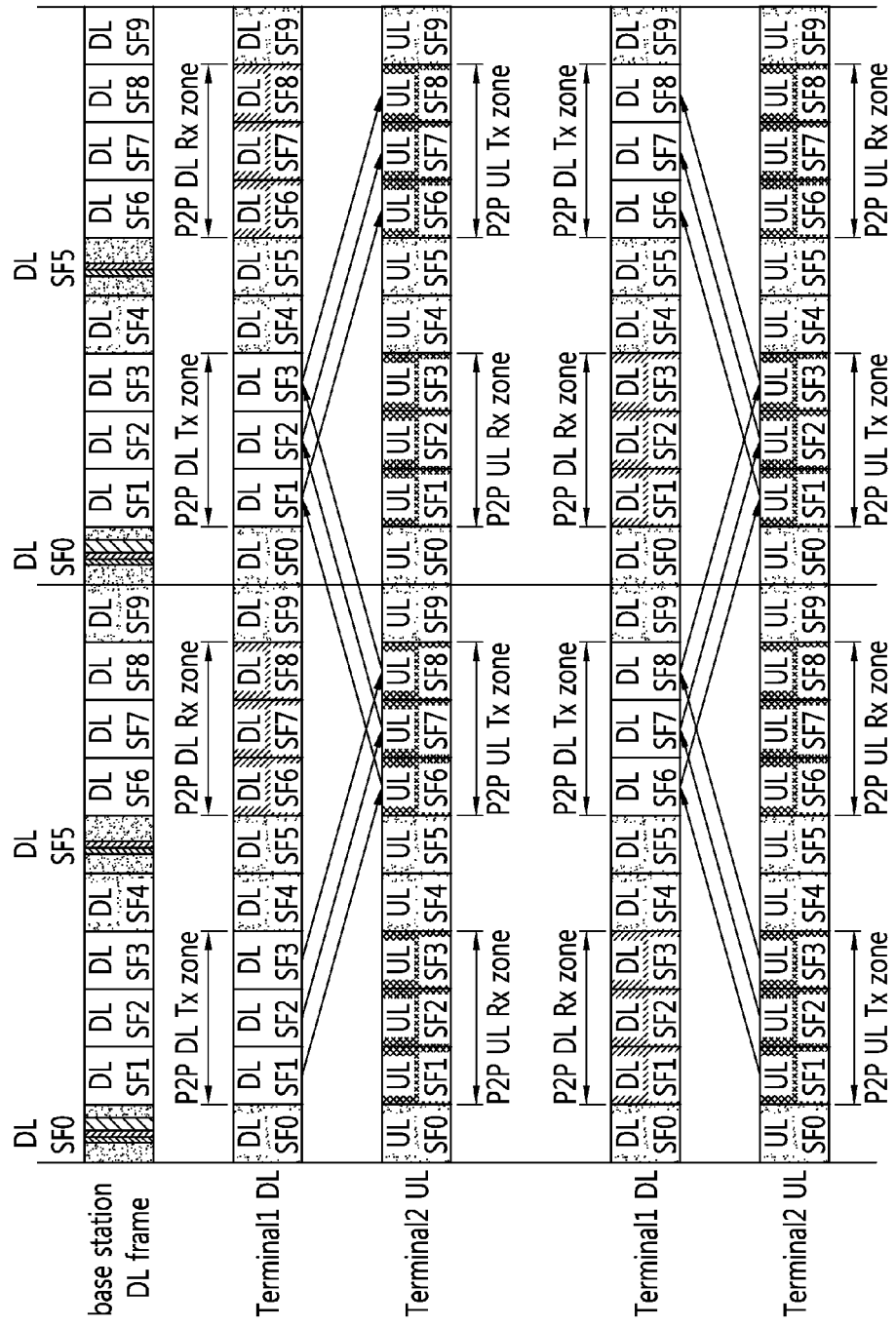

FIG. 6*b* shows an HARQ timing when P2P transmission between terminals is performed through a DL subframe.

When terminal 1 and terminal 2 perform P2P transmission, terminal 1 transmits a signal to terminal 2 through a DL frame, and terminal 2 transmits a feedback for the received data to terminal 1 through a UL frame. That is, terminal 1 transmits a signal to terminal 2 through the remaining DL subframes other than the subframes DL SF0, SF4, SF5, and SF9, and at this time, terminal 2 transmits a feedback to terminal 1 through a UL subframe having an HARQ linkage with the subframe where terminal 1 has transmitted a signal.

Referring to FIG. 6*b*, terminal 1 transmits data to terminal 2 through a DL subframe (e.g., DL SF1). Terminal 2 receives the data through the corresponding DL frame and in response transmits an HARQ (ACK/NACK) through a PUCCH or PUSCH of UL SF6. At this time, the processing time is considered as five subframes. Terminal 1, when receiving an ACK from terminal 2, transmits new data in the subframe (DL SF1) considering the processing time. Terminal 1, when receiving an NACK from terminal 2 or failing to receive HARQ information for a predetermined time, re-transmits the same data to terminal 2 through the subframe (DL SF1) considering the processing time. In the above example, since P2P transmission is fulfilled through the DL subframe, the HARQ between terminals is conducted using non-adaptive asynch-HARQ. However, the HARQ scheme is not limited thereto.

FIG. 6*c* shows an HARQ timing when P2P transmission between terminals is performed through only a UL frame.

Two terminals receive signals from the base station through the FDD DL frame and may perform P2P transmission through the FDD UL frame alone. In case the terminal transmits signals with the UL frame TDM-separated into a transmission zone and a reception zone, the terminal transmits and receives signals using the HARQ timing as shown in FIG. 6*c*. The transmission zone and reception zone on UL are opposite to each other between terminal 1 and terminal 2, and each subframe has a linkage considering a processing delay time (5 ms). For example, linkages such as (SF0, SF5); (SF1, SF6); (SF2, SF7); (SF3, SF8); (SF4, SF9) may be used. Since the P2P transmission is performed through only the UL frame, the terminal does not have any restriction in subframes for signal transmission/reception with the base station. One or more symbols are allocated as a gap in order for the terminal to perform transmission/reception switching in the UL frame. At this time, as shown in FIG. 6*c*, the last symbol of the last subframe of the transmission zone may be allocated as the gap. However, the position of the gap is not limited thereto.

Referring to FIG. 6*c*, the terminal receives control information and UL frame structure information (zone indication, gap, zone length (subframe or slot), mode cycle, etc.) for P2P transmission from the base station, and then, transmits the data to another terminal through the transmission zone in the UL frame. For example, terminal 1 transmits data to terminal 2 through UL SF1.

After receiving data through the reception zone of the corresponding UL frame, terminal 2 transmits an ACK/NACK for data reception to terminal 1 through UL SF5 considering the UL reception processing time. Terminal 1, when receiving the ACK from terminal 2, transmits new data through UL SF 1. Terminal 1, when receiving the NACK from terminal 2 or failing to receive the HARQ information for a predetermined time, performs re-transmission through UL SF 1. As described above, since the subframe linkage for data transmission and HARQ operation is uniform, the system overhead may be reduced. In the P2P transmission using the UL frame, HARQ may use both synch and asynch schemes.

FIG. 6*d* shows an HARQ timing when a frame is separated into a transmission zone and a reception zone.

In the DL frame, two DL zones are configured using the remaining subframes other than the subframes (SF0, SF4, SF5, and SF9) for receiving system information from the base station. The DL zone is divided into a DL transmission (Tx) zone and a DL reception (Rx) zone, and each zone consists of three subframes. In the UL frame, two zones may also be configured with the UL subframes having HARQ linkage with the DL subframes included in the DL zone. The UL zone may also be divided into a UL transmission zone and a UL reception zone.

The DL transmission zone is a zone where the terminal transmits a signal to another terminal through the DL subframe. The DL reception zone is a zone where the terminal receives a signal from another terminal through the DL subframe.

Referring to FIG. 6*d*, terminal 1 transmits data to terminal 2 using the DL transmission zone constituted of DL SF1, SF2, and SF3 in the DL frame. Terminal 2 receives data from terminal 1 through the DL reception zone (SF1, SF2, and SF3) constituted of the DL subframes present in the same positions. Terminal 2 transmits a feedback for the received data or HARQ information (ACK/NACK) to terminal 1 through the UL transmission zone (SF6, SF7, and SF8) of the corresponding frame having HARQ linkage. At this time, the processing time is considered as five subframes. Thereafter, terminal 2 transmits data to terminal 1 through the DL transmission zone (SF6, SF7, and SF8). At this time, terminal 1 receives data transmitted from terminal 2 trough the DL reception zone (SF6, SF7, and SF8) having HARQ linkage in the DL frame. At this time, terminal 1 may transmit a feedback for the received signal and HARQ information (ACK/NACK) to terminal 2 through the transmission zone (SF1, SF2, and SF3) of the UL frame.

When receiving the ACK and NACK, the terminal may perform transmission and re-transmission, respectively, of new data.

Figure 7B:
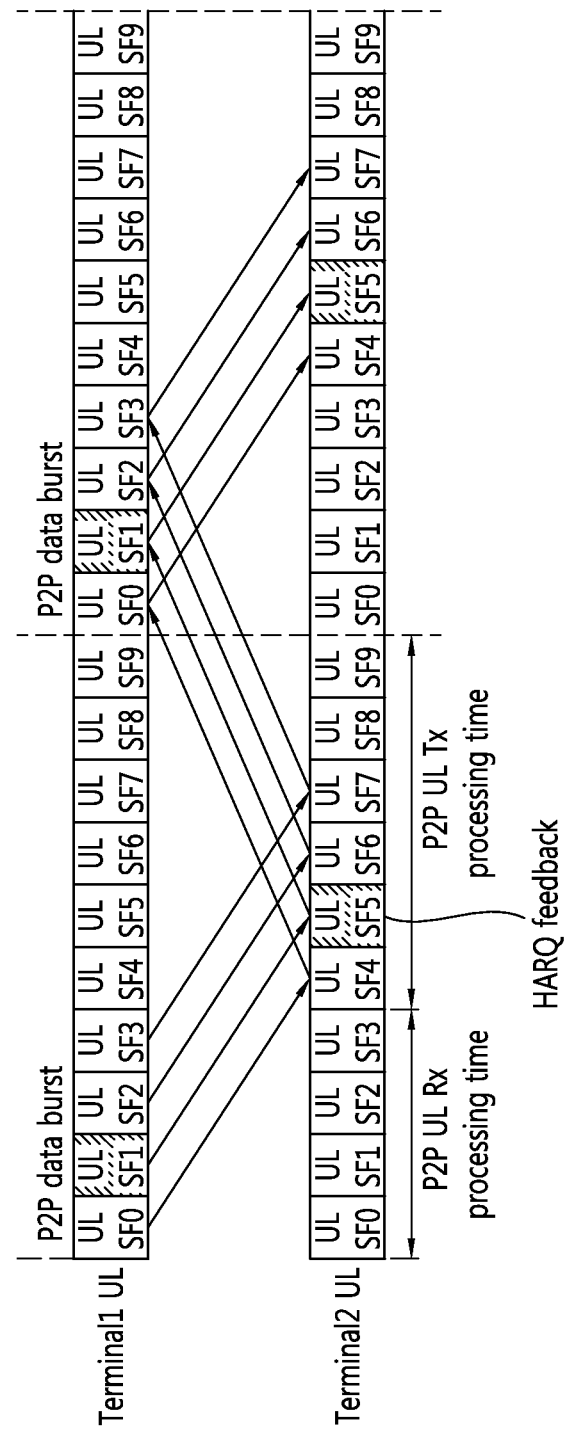

FIGS. 7a and 7b show a second embodiment of an HARQ operation according to the present invention.

Referring to FIGS. 7a and 7b, an embodiment is described in which P2P transmission use two processing time delays (DL/UL processing times).

As described above in FIG. 5b, a situation may occur where an access subframe overlaps a subframe for performing P2P transmission, so that an HARQ operation might not be efficiently performed. To avoid such situation, different processing times may apply to DL and UL, respectively. By way of example, if the HARQ is performed with a DL processing time of 4 ms and a UL processing time of 6 ms, the overlap between the subframes may be avoided.

The terminal receives control information for P2P communication from the base station. The control information may contain frame structure information used in the P2P communication. The frame structure information may include arrangement of a transmission zone and a reception zone in a frame and HARQ linkage between subframes. The HARQ linkage between subframes is configured so that a subframe having a linkage for HARQ does not overlap a subframe allocated for receiving a signal from the base station.

Referring to FIG. 7a, since a DL processing time of 4 ms applies to the HARQ for the signal transmitted from terminal 1 in DL SF1, terminal 2 transmits an ACK/NACK for the received signal in UL SF5. Since a UL processing time of 6 ms applies to the ACK/NACK transmitted from terminal 2, terminal 1 performs re-transmission or new transmission in DL SF1 of a next frame. This scheme may address the problem of the overlap of the access subframe in the P2P transmission. Different DL/UL processing times may also apply to UL transmission like the DL transmission, so that the HARQ operation may be effectively performed. At this time, the DL processing time may be 6 ms, and the UL processing time may be 4 ms.

Even when transmission between terminals is performed using only the UL frame, different processing times may apply as described above.

FIG. 7b shows another example of HARQ using different DL/UL processing times.

Here, the UL transmission processing time is 6 ms, and the UL reception processing time is 4 ms.

In case different processing times are used as shown in FIGS. 7a and 7b, the information on the processing times is transmitted from the base station to the terminal through P2P transmission information or P2P control information. No limitations are put to the transmission and reception processing times.

Figure 8A:
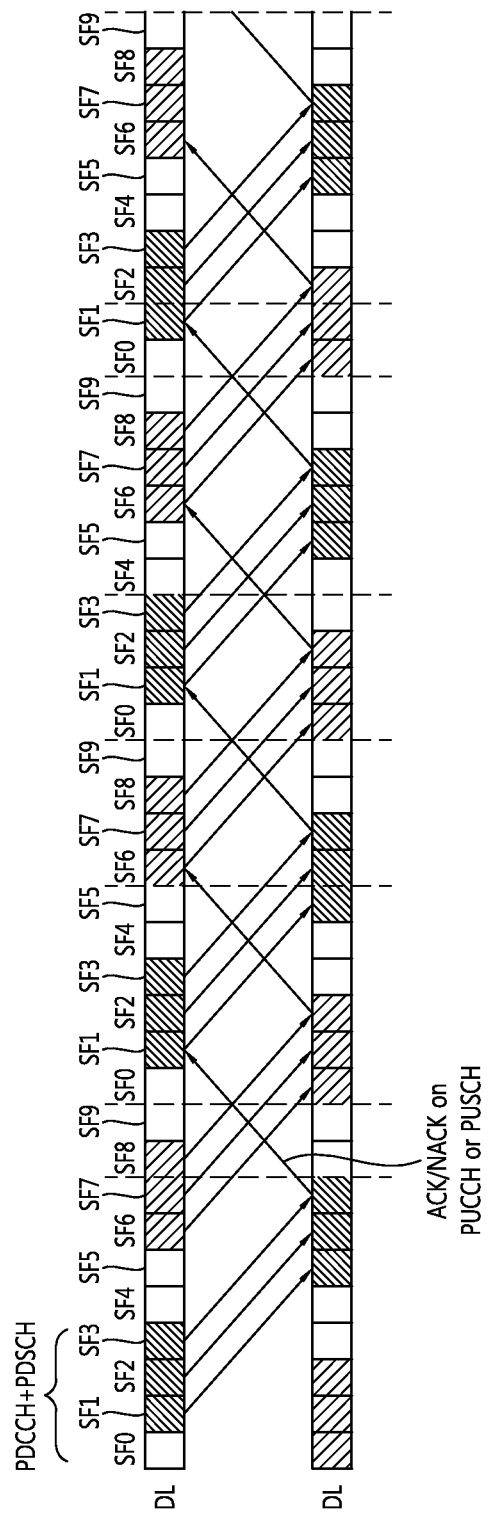
FIGS. 8a and 8b show a third embodiment of an HARQ operation according to the present invention.
Figure 8B:
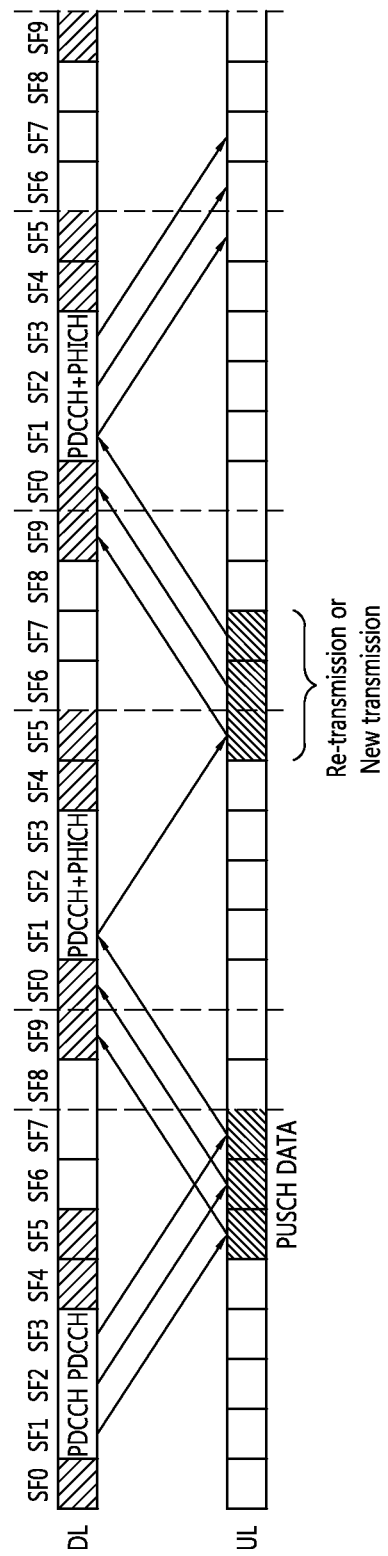

FIGS. 8a and 8b show a third embodiment of an HARQ operation according to the present invention.

Referring to FIGS. 8a and 8b, an embodiment of using multiple HARQs transmission or HARQ bundling for multiple subframes is described. By this scheme, efficient HARQ transmission may be conducted even without changing the existing processing time.

FIG. 8a shows an example of DL HARQ operation using the above scheme.

The terminal receives control information for P2P communication from the base station. The control information may include frame structure information used in the P2P communication. The frame structure information may include arrangement of a transmission zone and a reception zone in a frame and HARQ linkage between subframes. The HARQ linkage between subframes is configured so that a subframe having a linkage for HARQ does not overlap a subframe allocated for receiving a signal from the base station.

Terminal 1 transmits a PDCCH and a PDSCH to terminal 2 through DL SF1, SF2, SF3, SF6, SF7, and SF8. Terminal 2 may transmit an ACK/NACK for the received signal through UL SF5, SF6, SF7 and UL SF0, SF1, and SF2 of a next frame, which has a linkage with the DL SF. At this time, the subframes for terminal 1 having received the ACK/NACK to perform re-transmission or new transmission are DL SF9, SF0, and SF1. However, since DL SF9 and SF0 are subframes (access subframes) for receiving signals from the base station, terminal 1 does not perform the re-transmission or new transmission.

Accordingly, terminal 2 transmits both the ACK/NACK for DL SF1, SF2, and SF3 through the PUCCH or PUSCH of the UL SF7 mapped with the subframe (DL SF1) where no signal is received from the base station. Likewise, terminal 2 transmits all of the HARQ information for DL SF6, SF7, and SF8 through the UL SF2. As such, the HARQ for multiple subframes may be transmitted using the following scheme:

(1) Multiple ACK/NACK Transmission

The terminal transmits an ACK/NACK for each of three DL subframes through one UL SF. At this time, the ACKs/NACKs may be transmitted in three bits. At this time, the three bits representing the ACKs/NACKs for the subframes may be constituted of a group of ACK/NACK information each being one bit for each subframe or may be represented as multiple ACK/NACK indexes as shown in Table 1:

TABLE 1

| index | DL SF first | DL SF second | DL SF third |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 | where,
ACK = 1,
NACK = 0.

(2) ACK/NACK Bundling

The terminal bundles the ACKs/NACKs for the signals transmitted through the three DL subframes into one piece of information and transmits the information to another terminal. At this time, in the bundling, one bit obtained by performing an AND operation on one bit of ACK/NACK for each subframe may be transmitted as a result.

FIG. 8b shows an example of a UL HARQ operation using the above scheme.

The HARQ operation for UL transmission may also be operated by the same method as defined in the DL HARQ as described above in FIG. 8a. Referring to FIG. 8b, the terminal may transmit the HARQ for the signals transmitted through the three UL SFs through the PHICH of one DL subframe except the access subframes. At this time, the multiple ACKs/NACKs or ACK/NACK bundling may be used.

Figure 9A:
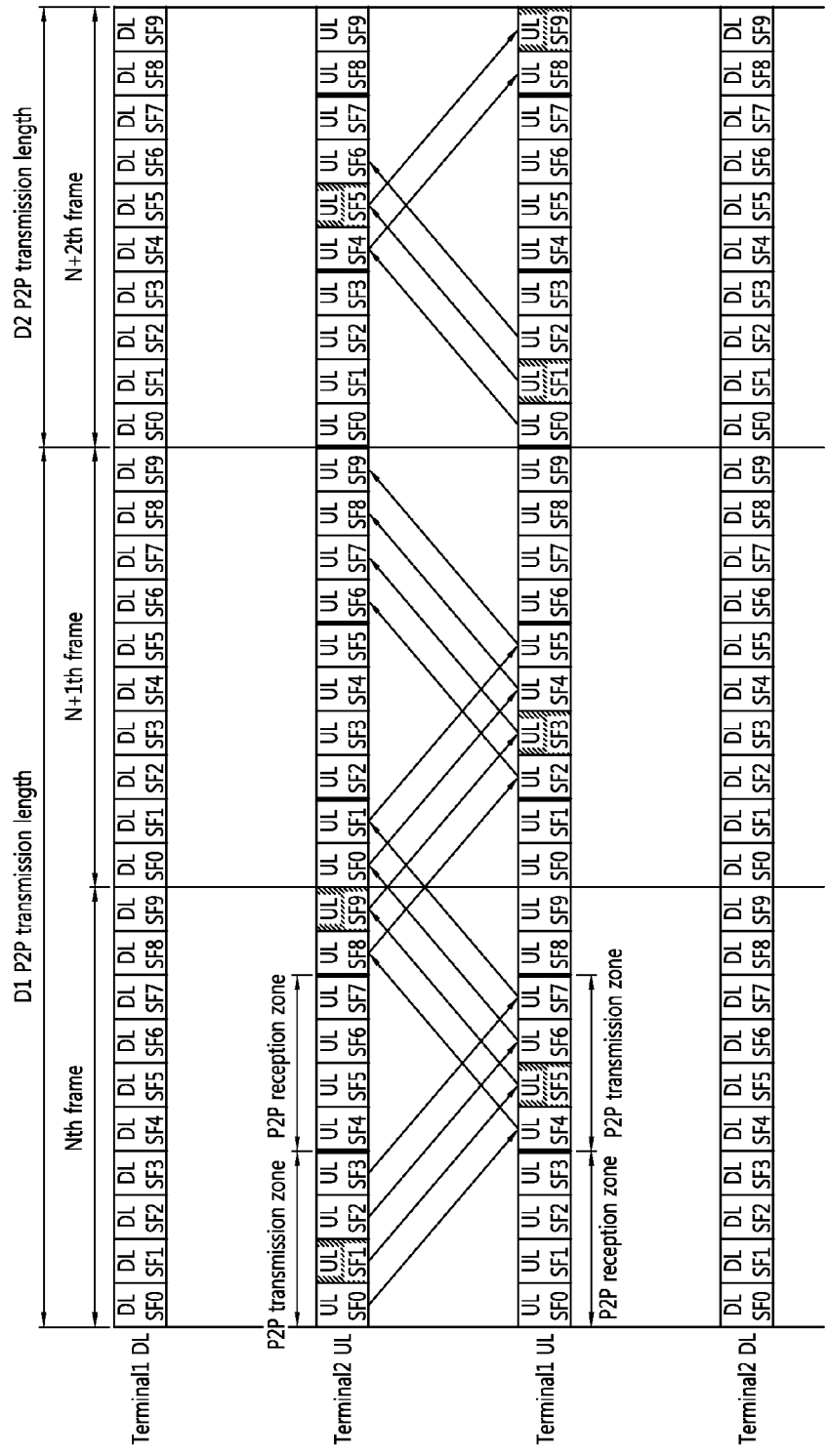
FIGS. 9a and 9b show a fourth embodiment of an HARQ operation according to the present invention.
Figure 9B:
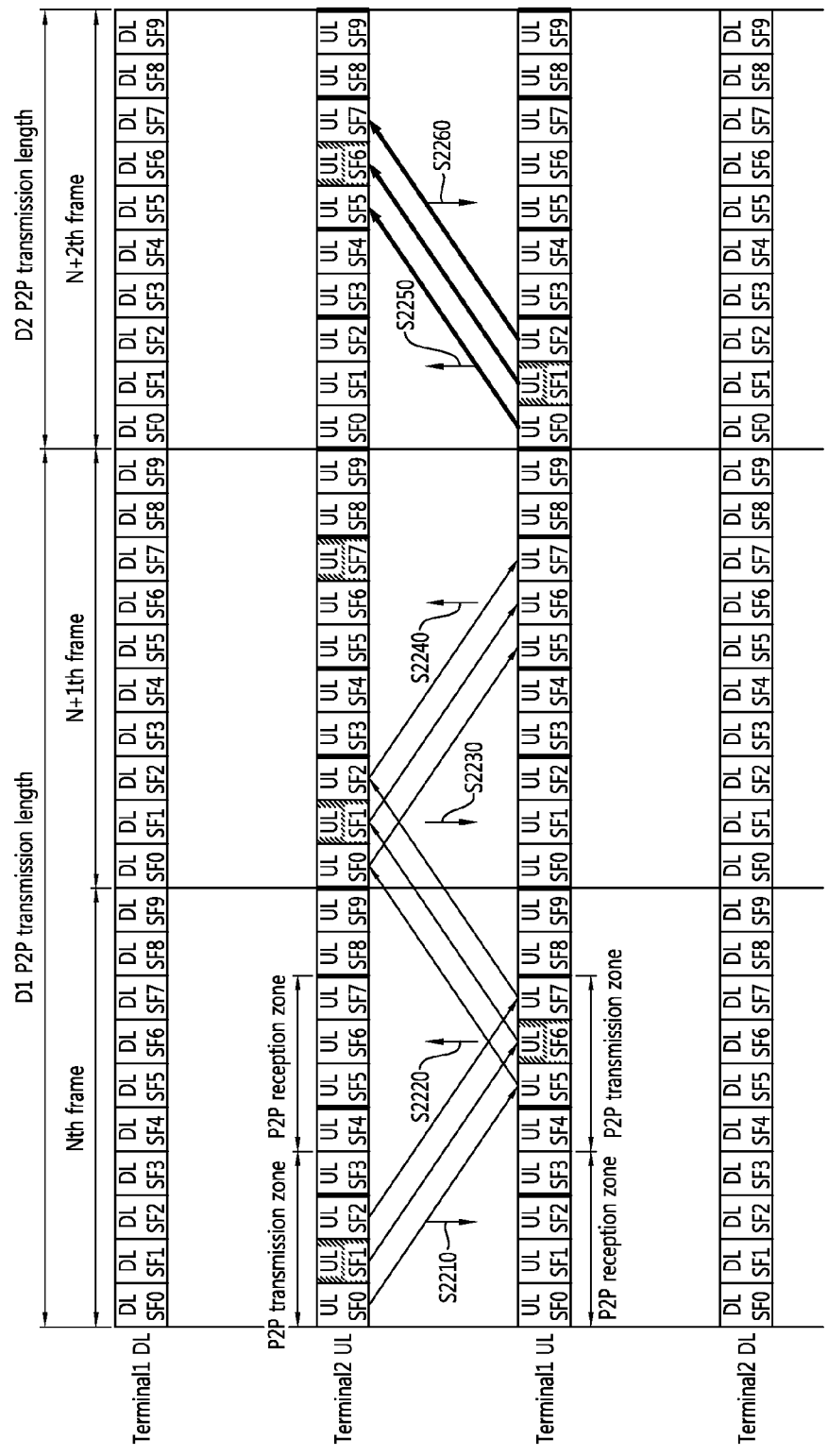

FIGS. 9a and 9b show a fourth embodiment of an HARQ operation according to the present invention.

FIGS. 9a and 9b show an embodiment of performing P2P transmission and an HARQ using only a UL frame without changing the existing processing time. Since the processing time of the existing system is 4 ms and the HARQ operation has a cycle of 8 ms, the frame for this embodiment is constituted of a virtual frame structure (VFS) having an integer multiple of 8 ms and may be represented as shown in FIG. 9a.

FIG. 9a shows a frame structure in which a P2P transmission zone and reception zone are present in one UL frame. For switching between the transmission mode and the reception mode, a gap is allocated between the two zones. At this time, one or more symbols are allocated as the gap, and the positions thereof include the last symbol of the last subframe of the transmission zone or the first symbol of the first subframe of the reception zone. Here, the UL transmission zone and reception zone for transmission/reception of signals between terminals may be constituted of four multiples of the frame or on a per-superframe basis. Accordingly, switching for the transmission between terminals (a link from terminal 1 to terminal 2 and a link from terminal 2 to terminal 1) may also be performed at a cycle of four multiple of a frame or a super-frame like the switching between the transmission/reception zones.

FIG. 9a shows a frame structure showing data transmission from terminal 1 to terminal 2, HARQ operation, and transmission from terminal 2 to terminal 1. Terminal 1 and terminal 2 transmit and receive signals at a virtual frame cycle (8 ms) for P2P transmission.

Terminal 1 transmits data to terminal 2 through the UL transmission zone (e.g. UL SF1) of the Nth frame. Terminal 2 transmits an ACK/NACK for the received signal to terminal 1 through the subframe (e.g., UL SF4) of the UL transmission zone considering the processing time. Terminal 1, when receiving the ACK from terminal 2, transmits new data to terminal 2 through the subframe (e.g., UL SF9) present at the same position in the virtual frame. When receiving the NACK or failing to receive the HARQ information, terminal 1 performs re-transmission through the subframe in the same virtual frame as the frame where the initial data has been transmitted.

Thereafter, terminal 2 performs transmission/reception zone switching in the frame according to a transmission switching indication received from the base station and transmits a signal to terminal 1. Even in such case, terminal 2 may receive an ACK/NACK through the same HARQ transmission.

Since signals are transmitted or received through terminals using the UL frame, terminal 1 and terminal 2 may transmit and receive signals therebetween even without transmission switching. For example, in case a signal is transmitted from terminal 1 to terminal 2, terminal 2 may transmit data together with the ACK/NACK for the signal received from terminal 1. At this time, when receiving the ACK/NACK and data, terminal 1 may transmit ACK/NACK information for the signal transmitted from terminal 2 along with new or re-transmission data using the virtual subframe that is located in the same position as the virtual subframe where data has been transmitted to terminal 2. That is, the terminals may transmit/receive signals therebetween in the frame by transmitting the ACK/NACK information for the received data and the data in the P2P transmission.

FIG. 9b shows an HARQ process when an ACK/NACK needs to be transmitted for data received from a base station, together with P2P transmission.

In FIG. 9b, the terminal may transmit a signal and an HARQ using the same method as what is shown in FIG. 9a, and at this time, signals are transmitted/received between the terminals using the remaining UL subframes other than the UL subframe for transmitting an ACK/NACK for the signal received by the terminal from the base station. At this time, since the terminal transmits an ACK/NACK through a subframe having linkage considering a processing time of 4 ms (defined in the LTE system), P2P transmission may be conducted without affecting signal transmission/reception with the base station. To transmit and receive a signal and HARQ between the terminals through the remaining subframes other than the UL subframe for transmitting/receiving a signal with the base station, the terminal may transmit and receive the signal and HARQ using a UL reception processing time and a UL transmission processing time for P2P transmission which are different from the processing time for transmission/reception with the base station. At this time, the UL transmission processing time and the UL reception processing time may use different values from each other. FIG. 9b shows an HARQ operation in which a processing time of 5 ms applies to both transmission and reception. Since the terminal operates in the transmission mode of always transmitting a signal in the UL subframe having HARQ linkage for the access subframe, the terminal in the P2P transmission allocates, as a gap, the first and last symbols of the first and last subframes, respectively, of the transmission/reception zones for mode switching. At this time, the number of symbols allocated as the gap is not limited.

The terminal receives information for P2P transmission from the base station through the access subframes (DL SF0, SF4, SF5, and SF9). At this time, HARQ information for the data received from the base station should be transmitted. In such case, a problem occurs of an overlap with the subframe where the HARQ information for P2P transmission is transmitted. Accordingly, if the paging information received through the access subframe includes call information or a request message, the terminal stops the P2P transmission and transmits a feedback and HARQ information for the information received from the base station. Unless the paging information received through the access subframe includes call information or a request message, the terminal performs P2P transmission between terminals without transmitting a feedback and HARQ information to the base station.

The terminal may use an SNR or interference level as a threshold for selecting one of the P2P transmission and signal transmission with the base station. When receiving a feedback, a request for the UL signal transmission, or a call from the base station, the terminal may receive the threshold as well. At this time, the terminal, if the SINR or interference level satisfies the threshold, transmits/receives signals with the base station, and otherwise, performs P2P transmission.

Although in the present invention, HARQ timing and frame structure have been primarily described for P2P transmission in the LTE FDD system, the same schemes of HARQ and frame structure may also apply to other communication systems (for example, IEEE 802.16m, 802.16p) using the FDD system to perform P2P transmission between terminals.

Figure 10:
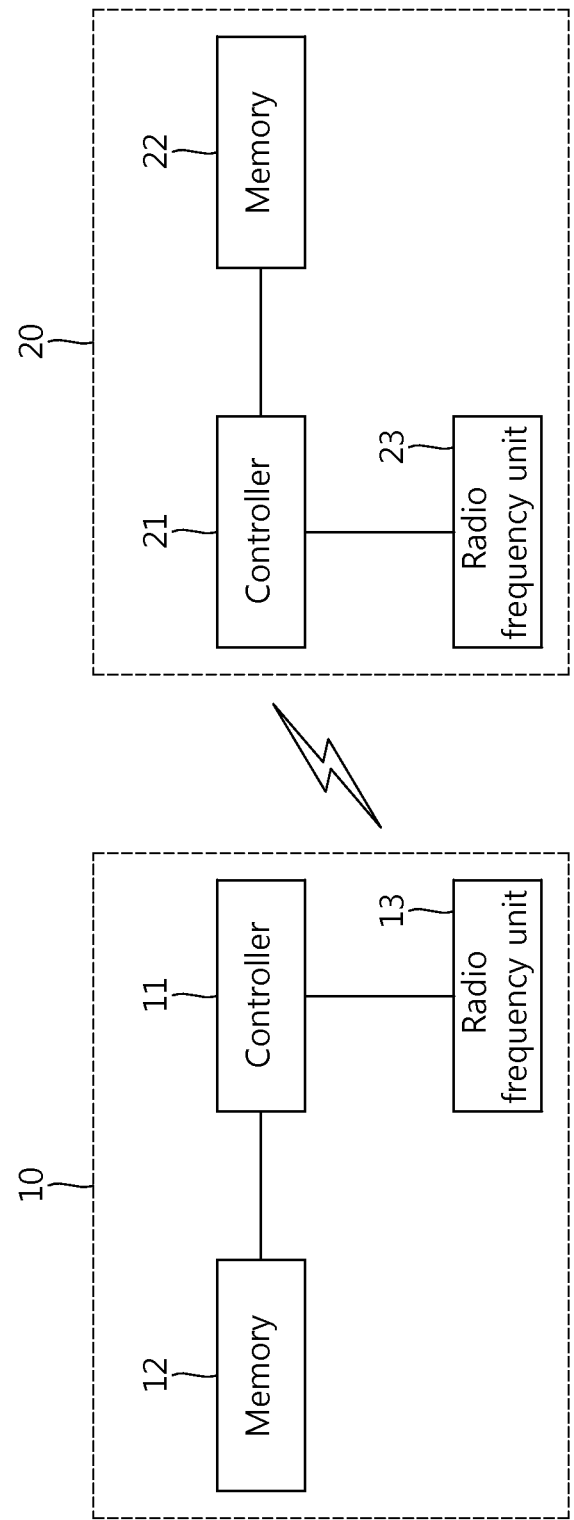
FIG. 10 is a block diagram showing internal structures of an MS and a BS according to an embodiment of the present invention.

FIG. 10 is a block diagram showing internal structures of an MS and a BS according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

The present invention may be implemented in another specific form within the scope without departing from the spirit and essential feature of the present invention. Therefore, the detailed description should not limitatively be analyzed in all aspects and should be exemplarily considered. The scope of the present invention should be determined by rational interpretation of the appended claims and all changes are included in the scope of the present invention within the equivalent scope of the present invention. Further, claims having no clear quoting relation in the claims are combined to configure the embodiment or may be included as new claims by correction after application.

What is claimed is:

1. A method of performing, by a terminal, a hybrid automatic repeat request (HARQ) in a wireless access system supporting peer-to-peer (P2P) communication between terminals, the method comprising:

receiving control information for P2P communication from a base station;

transmitting data to an other terminal in a downlink subframe or uplink subframe defined as a transmission zone for transmission to the other terminal based on the received control information; and receiving an acknowledgement (ACK) or a not-acknowledgement (NACK) for the transmitted data in an uplink subframe, associated with the downlink or the uplink subframe, among subframes defined as a reception zone for reception from the other terminal, wherein the control information includes frame structure information used for the P2P communication, wherein the frame structure information includes information related to an arrangement of the transmission zone and the reception zone in a frame and information related to an HARQ linkage between subframes, wherein the HARQ linkage between the subframes is configured so that a subframe associated for an HARQ does not overlap a subframe allocated for receiving a signal from the base station, wherein the information related to the HARQ linkage between the subframes includes information related to a processing delay time for a downlink (DL) HARQ procedure and a processing delay time for an uplink (UL) HARQ procedure, and wherein the processing delay time for the DL HARQ procedure and the processing delay time for the UL HARQ procedure are set to be the same or are set to be different.

2. The method of claim 1, wherein when the processing delay time for the DL HARQ procedure is set to be the same as the processing delay time for the UL HARQ procedure, the processing delay time for the DL HARQ procedure and the processing delay time for the UL HARQ procedure are both 5 ms.

3. The method of claim 1, wherein when the processing delay time for the DL HARQ procedure is set to be different from the processing delay time for the UL HARQ procedure, the processing delay time for the UL HARQ procedure is 6 ms and the processing time for the DL HARQ procedure is 4 ms.

4. The method of claim 1, wherein receiving the ACK or the NACK includes receiving ACKs or NACKs, for the data transmitted in one transmission zone, in one uplink subframe.

5. The method of claim 4, wherein the ACKs or the NACKs are transmitted as a group in which each ACK or NACK is represented as a specific length of bits.

6. The method of claim 4, wherein the ACKs or the NACKs are transmitted in a form obtained by combining the ACKs or the NACKs through a predetermined logic operation.

7. A terminal performing a hybrid automatic repeat request (HARQ) in a wireless access system supporting peer-to-peer (P2P) communication between terminals, the terminal comprising:

a radio frequency unit configured to transmit and receive a wireless signal from an outside; and a controller connected with the radio frequency unit and configured to:

receive control information for P2P communication from a base station;

transmit data to an other terminal in a downlink subframe or uplink subframe defined as a transmission zone for transmission to the other terminal based on the received control information; and receive an acknowledgement (ACK) or a not-acknowledgement (NACK) for the transmitted data in an uplink subframe, associated with the downlink or the uplink subframe, among subframes defined as a reception zone for reception from the other terminal, wherein the control information includes frame structure information used for the P2P communication, wherein the frame structure information includes information related to an arrangement of the transmission zone and the reception zone in a frame and information related to an HARQ linkage between subframes, wherein the HARQ linkage between the subframes is configured so that a subframe associated for an HARQ does not overlap a subframe allocated for receiving a signal from the base station, wherein the information related to the HARQ linkage between the subframes includes information related to a processing delay time for a downlink (DL) HARQ procedure and a processing delay time for an uplink (UL) HARQ procedure, and wherein the processing delay time for the DL HARQ procedure and the processing delay time for the UL HARQ procedure are set to be the same or are set to be different.

8. The terminal of claim 7, wherein the controller controls the radio frequency unit to receive ACKs or NACKs, for the data transmitted in one transmission zone, in one uplink subframe.

9. The terminal of claim 7, wherein when the processing delay time for the DL HARQ procedure is set to be the same as the processing delay time for the UL HARQ procedure, the processing delay time for the DL HARQ procedure and the processing delay time for the UL HARQ procedure are both 5 ms.

10. The terminal of claim 7, wherein when the processing delay time for the DL HARQ procedure is set to be different from the processing delay time for the UL HARQ procedure, the processing delay time for the UL HARQ procedure is 6 ms and the processing time for the DL HARQ procedure is 4 ms.

* * * * *